(12) United States Patent
Borigo et al.

(10) Patent No.: US 11,536,693 B2
(45) Date of Patent: Dec. 27, 2022

(54) FOLDED FLAT FLEXIBLE CABLE GUIDED WAVE SENSOR

(71) Applicant: FBS, Inc., Bellefonte, PA (US)

(72) Inventors: Cody J. Borigo, Elizabethtown, PA (US); Steven E. Owens, State College, PA (US)

(73) Assignee: FBS, Inc., Bellefonte, PA (US)

( * ) Notice: Subject to any disclaimer, the term of this patent is extended or adjusted under 35 U.S.C. 154(b) by 0 days.

(21) Appl. No.: 17/223,173

(22) Filed: Apr. 6, 2021

(65) Prior Publication Data

US 2021/0310990 A1   Oct. 7, 2021

Related U.S. Application Data

(60) Provisional application No. 63/006,368, filed on Apr. 7, 2020.

(51) Int. Cl.
*G01N 27/82* (2006.01)

(52) U.S. Cl.
CPC ................... *G01N 27/82* (2013.01)

(58) Field of Classification Search
CPC .......... G01N 27/82; G01N 2291/0231; G01N 2291/044; G01N 29/043; G01N 29/46
See application file for complete search history.

(56) References Cited

U.S. PATENT DOCUMENTS

| | | | |
|---|---|---|---|
| 5,581,037 A | 12/1996 | Kwun et al. | |
| 6,000,288 A | 12/1999 | Kwun et al. | |
| 6,396,262 B2 | 5/2002 | Light et al. | |
| 6,429,650 B1 | 8/2002 | Kwun et al. | |
| 6,624,628 B1* | 9/2003 | Kwun | G01N 29/11 324/240 |
| 7,573,261 B1 | 8/2009 | Vinogradov | |
| 7,821,258 B2 | 10/2010 | Vinogradov | |
| 7,913,562 B2* | 3/2011 | Kwun | G01N 29/2412 73/624 |
| 8,098,065 B2 | 1/2012 | Kwun et al. | |
| 8,358,126 B2 | 1/2013 | Light et al. | |
| 9,632,061 B2* | 4/2017 | Takahashi | H01L 22/26 |
| 2012/0119732 A1* | 5/2012 | Rose | G01N 29/2412 324/240 |
| 2016/0290965 A1* | 10/2016 | Owens | G01N 27/82 |
| 2019/0131042 A1* | 5/2019 | Johnson | G01R 31/72 |

* cited by examiner

*Primary Examiner* — Dominic E Hawkins
(74) *Attorney, Agent, or Firm* — Duane Morris LLP

(57) ABSTRACT

A sensor includes a flexible cable arranged to provide a plurality of independent electrical coils and a connector. Each of the plurality of independent electrical coils extend from a first end to a second end and is configured to be wrapped at least partially around a surface of a structure to be tested. The connector is electrically coupled to the first end of at least one of the plurality of independent electrical coils. The plurality of independent electrical coils is configured such that current will flow in a common direction between the first ends and the second ends within each said independent coil. Systems and methods also are disclosed.

16 Claims, 16 Drawing Sheets

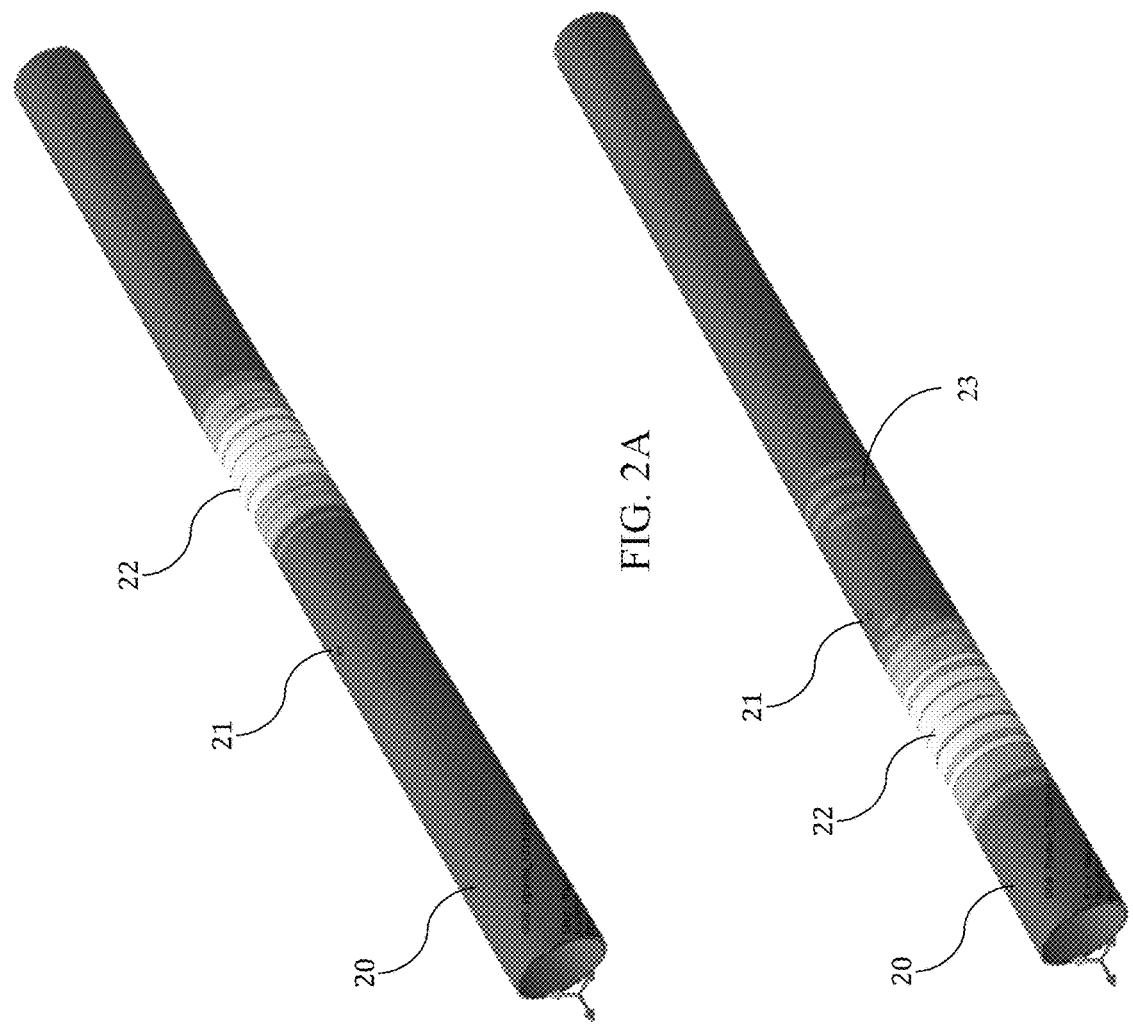

FOLDED FLAT FLEXIBLE CABLE GUIDED WAVE SENSOR

CROSS-REFERENCE TO RELATED APPLICATIONS

This application claim priority to U.S. Provisional Patent Application No. 63/006,368, filed Apr. 7, 2020, entitled "FOLDED FLAT FLEXIBLE CABLE GUIDED WAVE SENSOR," the entirety of which is incorporated by reference herein.

FIELD OF DISCLOSURE

The disclosed systems and methods relate to non-destructive testing and structural health monitoring. More specifically, the disclosed systems and methods relate to structural heath monitoring and non-destructive examination of tubes, pipes, rods, and similar structures.

BACKGROUND

Non-destructive testing (NDT) and structural health monitoring (SHM) techniques are frequently used to test or inspect a material without causing damage. For example, such NDT/SHM techniques may be used to inspect welds or identify defects in pipes, airplane components, and other devices or materials in which maintaining the integrity of (i.e. not damaging) the device or material is desirable. For the purposes of the present technology, NDT refers to the non-invasive inspection of a structure or component, in which the evaluation of said structure or component is conducted on the data collected during the current inspection period and does not rely on comparison to previous data sets. Furthermore, for the purposes of the present disclosure, SHM refers to one of the permanent installation of a sensor for long-term monitoring of a structure or component or a method in which the evaluation of said structure or component relies on a comparison between data collected on said structure or component from an equivalent test location at a previous time.

Ultrasonic guided waves are a specific method for the NDT/SHM of structures or components in which low-frequency (generally <1 MHz) ultrasonic waves are introduced into the structure that subsequently interact with the local boundaries of the structure and form a coherent propagating wave packet that then follows the structure. Such boundaries may be the external surfaces of a particular material or the boundary may be an interface between two materials. The propagation characteristics of the wave packet are dictated by the cross-sectional dimensions and material properties of the structure. Unlike traditional ultrasonic waves that may be used to perform localized testing or inspection, guided waves may be used to perform remote testing or inspection of a material through various NDT/SHM techniques. In the pulse-echo guided wave technique, appurtenances, such as welds, structural attachments, cracks, or metal loss, reflect portions of the wave packet back toward the generating sensor where it is received by the generating sensor or by a separate receiving sensor and then amplified, digitized, processed, and displayed. These reflections may be analyzed to determine the extent of the abnormality or defect as well as the location of such abnormality or defect.

Ultrasonic guided wave techniques are utilized in a wide range of non-destructive inspection applications including those for pipes, plates, and shells comprised of metals, composites, and other materials. Long-range guided wave techniques are often utilized for the inspection of pipelines; technologies currently exist that utilize one of piezoelectric or magnetostrictive means. Some long-range guided wave testing technologies utilize a segmented collar design, in which at least one of the pulser/receiver sensors is divided into discrete segments around the circumference of the pipe, while others utilize an axisymmetric collar design, in which the transducer is not segmented around the circumference of the pipe.

SUMMARY

In some embodiments, the disclosed system includes a flexible collar at least partially comprising at least one strip of magnetostrictive material, at least one flat flexible cable (FFC), and at least one printed circuit board. The at least one magnetostrictive strip is configured to be induced with a bias magnetic field and be wrapped at least partially around an outer surface of the structure under test. At least one FFC is configured to be disposed adjacent to the at least one magnetostrictive strip and to at least one of generate and detect a time-varying magnetic field parallel to said strip. The at least one FFC is further configured such that it has a closed-circuit configuration, which ensures that a plurality of FFC coil regions are configured in a common direction and orientation that reinforces the time-varying magnetic field, and therefore advantageously improves the signal amplitude and advantageously requires neither the disconnection nor connection of either free end of the FFC or any electrical connectors when the collar is wrapped around or removed from the structure. The at least one FFC features at least one fold and is configured into at least one coil layer having at least one independent coil that is electrically connected on each of two ends to the at least one printed circuit board, which is further electrically connected to a controller to at least one of excite or detect guided waves in said structure.

In some embodiments, a sensor includes a flexible cable arranged to provide a plurality of independent electrical coils and a connector. Each of the plurality of independent electrical coils extend from a first end to a second end and is configured to be wrapped at least partially around a surface of a structure to be tested. The connector is electrically coupled to the first end of at least one of the plurality of independent electrical coils. The plurality of independent electrical coils is configured such that current will flow in a common direction between the first ends and the second ends within each said independent coil.

In some embodiments, a system includes at least one strip of magnetostrictive material configured to be wrapped at least partially around a surface of a structure. At least one biasing magnet is configured to apply a biasing magnetic field to said at least one magnetostrictive material, and a flexible cable is arranged to provide a plurality of independent electrical coils. Each of the plurality of independent electrical coils extends from a first end to a second end. A connector is electrically coupled to the first end of at least one of the plurality of independent electrical coils. A processor is in signal communication with the plurality of independent electrical coils and is configured to generate current in the plurality of independent electrical coils. The plurality of independent electrical coils is configured such that current generated by the processor will flow in a common direction between the first ends and the second ends within each said independent coil.

A method includes wrapping a plurality of independent electrical coils provided by a flexible cable at least partially around a surface of a structure to be tested such that the plurality of independent electrical coils are disposed adjacent to a magnetostrictive material and a first end of the plurality of independent electrical coils is disposed adjacent to a second end of the plurality of independent electrical coils. A biasing magnetic field is applied to the magnetostrictive material, and a current is generated in the plurality of independent electrical coils. The current flows in common direction through the plurality of independent electrical coils between the first end and the second end within each said independent coil.

BRIEF DESCRIPTION OF THE DRAWINGS

FIG. 2A is an illustration of axisymmetric guided waves in a pipe with a defect.

FIG. 2B is an illustration of axisymmetric and flexural guided waves in a pipe with a defect.

DETAILED DESCRIPTION

Figure 1:
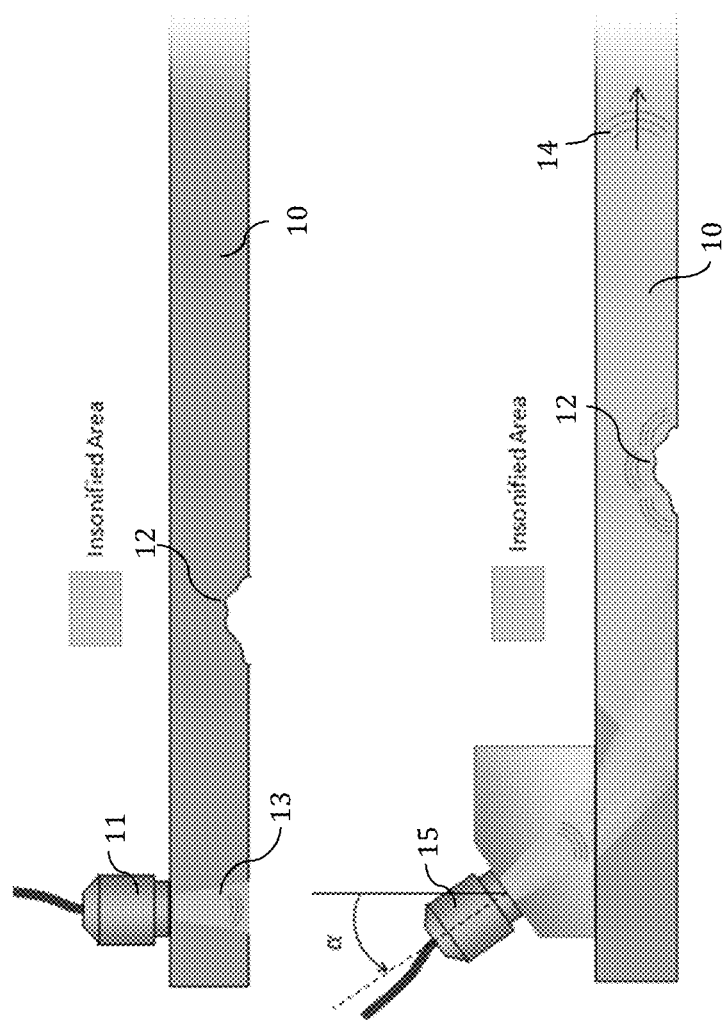
FIG. 1 is a conceptual illustration of the differences between ultrasonic bulk waves and ultrasonic guided waves.

This description of the exemplary embodiments is non-limiting and is intended to be read in connection with the accompanying drawings, which are to be considered part of the entire written description.

Guided waves are formed from the constructive interference of ultrasonic bulk waves that have interacted with the boundaries of the structure in which they propagate. Guided waves are unique in the sense that they are capable of propagating for long distances compared to traditional ultrasonic waves and can be used to inspect hidden/inaccessible structures like buried or cased piping and tubing. Unlike "spot-checking" with traditional ultrasonic techniques, guided waves provide at or near 100% volumetric inspection. Furthermore, guided waves provide an efficient and cost-effective means of inspection due to increased inspection speed and simplicity.

Various means of guided wave transduction may be used, including piezoelectric transducers, electromagnetic acoustic transducers (EMATs), impact devices, and magnetostrictive transducers. Magnetostrictive transducers may be utilized for the purposes of long-range pipe inspection. Long-range guided wave pipe inspection systems can inspect pipelines over distances of up to several hundred feet in each direction from a fixed transducer collar location and have been implemented using various means.

For the purposes of the description, the term "pipe" refers to generally hollow cylinders, including, but not limited to, structures such as pipes, tubes, cylinders, and cylindrical vessels. It is to be understood that the applications of the disclosed systems and methods can further include rods, multi-strand wires, and structures with non-circular cross-section, including beams and rails.

For the purposes of the description, the term "torsional guided waves" refers to the class of torsional sonic/ultrasonic guided stress waves in hollow structures, which have predominantly in-plane displacement fields perpendicular to the wave propagation direction. This term encompasses axisymmetric T(0, n) and non-axisymmetric, i.e. flexural, T(m, n) modes in the torsional mode families of guided waves in hollow cylinders, in which n may be representative of any non-zero integers.

For the purposes of the description, the term "longitudinal guided waves" refers to the class of longitudinal sonic/ultrasonic guided stress waves in hollow structures, which have predominantly out-of-plane displacement fields and in-plane displacement fields parallel to the wave propagation direction. This term encompasses axisymmetric L(0, n) and non-axisymmetric, i.e. flexural, L(m, n) modes in the longitudinal mode families of guided waves in hollow structures, in which n may be representative of any non-zero integers.

For the purposes of the description, the term "axisymmetric guided wave" refers to guided wave energy that is generally uniform around the circumference of the pipe, e.g. the T(0, n) or L(0, n) modes. Although pure axisymmetric mode excitation may be impossible in practice due to imperfections in loading patterns and amplitudes around the circumference of said pipe, quasi-axisymmetric waves can be effectively considered to be axisymmetric when interpreting and processing the data, especially after these waves have propagated a short distance away from the excitation source. Axisymmetric or quasi-axisymmetric excitation on a pipe predominantly excites the axisymmetric modes in said pipe.

FIG. 1 compares an ultrasonic "bulk wave" 13 and an ultrasonic "guided wave" 14 in a plate-like structure 10, which could be representative of, for example, a pipe wall. Both types of waves are capable of detecting corrosion 12, but the bulk wave transducer 11 must be located directly above the corrosion, as it only insonifies a localized region below it. The guided wave transducer 15, on the other hand, can be located remotely from corrosion 12 and still detect it since the guided wave 14 is capable of filling the entire cross-section of the structure 10 with energy that propagates some distance away from the transducer location. This capability of long-range propagation and remote detection is a great advantage for guided wave technologies.

FIGS. 2A and 2B illustrate one embodiment of axisymmetric and flexural guided waves that are generated and detected by the magnetostrictive guided wave pipeline inspection system. FIG. 2A illustrates an axisymmetric guided wave 22 in a pipe 20. Axisymmetric wave 22 is generated by an axisymmetric pulser collar and propagates along the axis of the pipe with generally uniform energy distribution around the circumference. In FIGS. 2A and 2B, the axisymmetric wave is propagating from right to left toward corrosion defect 21 localized on the top of pipe 20. The magnetostrictive guided wave pipeline inspection system emits axisymmetric waves in order to have equal sensitivity to reflectors on all sides of the pipe. FIG. 2B shows that some fraction of the guided wave energy from axisymmetric wave 22 is reflected from defect 21 in the form of a generally non-axisymmetric (i.e. flexural) guided wave 23. The circumferential distribution of flexural guided wave 23 does not immediately reveal the circumferential location of defect 21; this is due to the fact that these flexural waves spiral around the pipe 20 as they propagate away from a non-axisymmetric reflector such as defect 21. In some embodiments, the magnetostrictive guided wave pipeline inspection system utilizes advanced post-processing algorithms to determine the location and size of defects in the pipe based on knowledge of the guided wave mechanics in the pipe and the circumferential distribution of the reflected wave field. Although the axisymmetric wave 22 may not be perfectly axisymmetric and thus contain some small percentage of its energy in flexural wave modes, it will be referred to as "axisymmetric" herein for simplicity. Likewise, flexural wave reflections 23 may contain a large percentage of axisymmetric wave mode energy if they are reflected from generally axisymmetric reflectors such as welds or flanges, or they may only contain a small amount of axisymmetric wave mode energy if reflected from generally non-axisymmetric reflectors such as corrosion, erosion cracks, tees, branches, pipe supports, or other pipe features. These reflections, for simplicity, will be generally referred to as "flexural" herein.

Figure 3A:
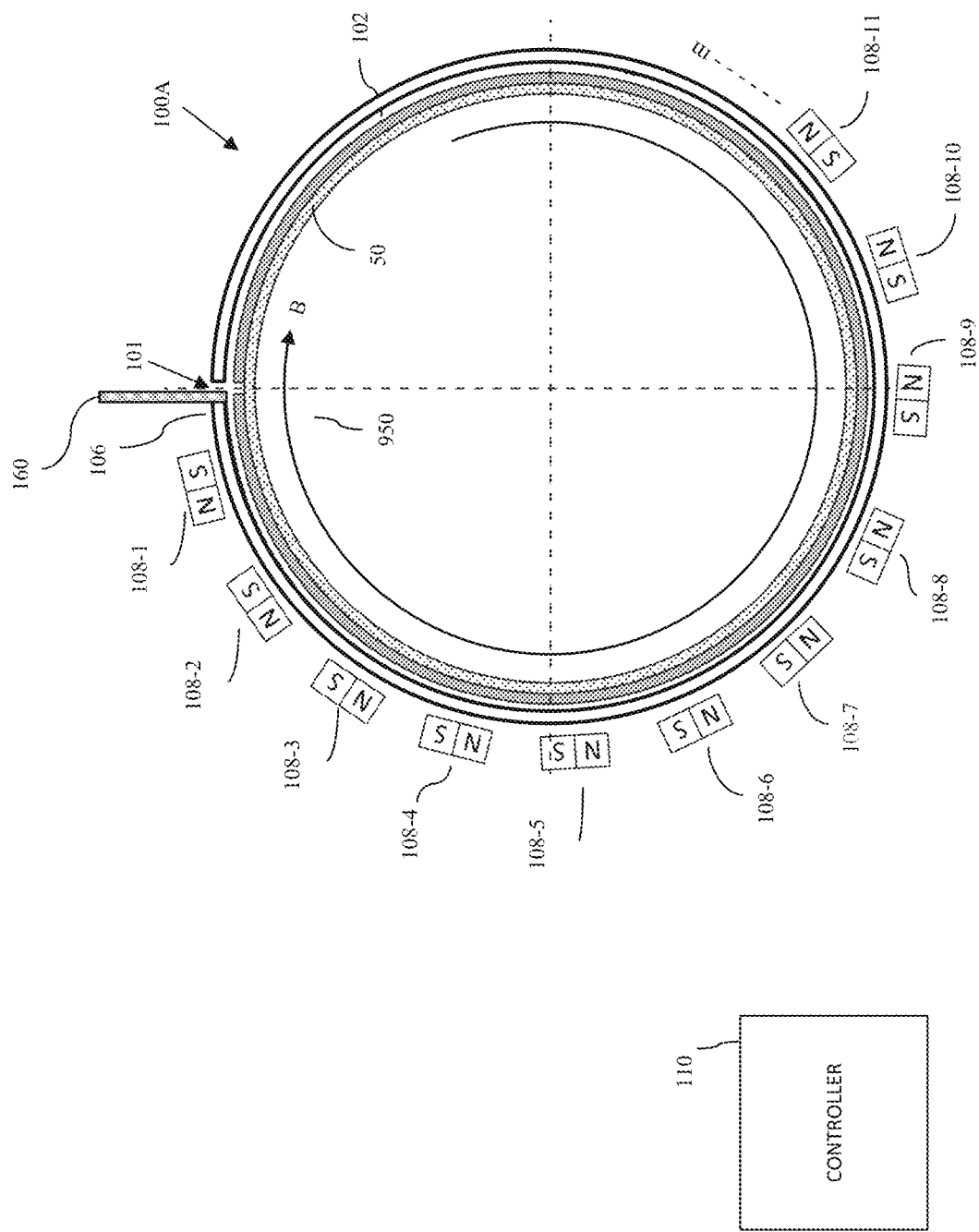
FIG. 3A is a cross-sectional side view of a first example of a single-layer axisymmetric magnetostrictive collar in accordance with some embodiments.
Figure 3B:
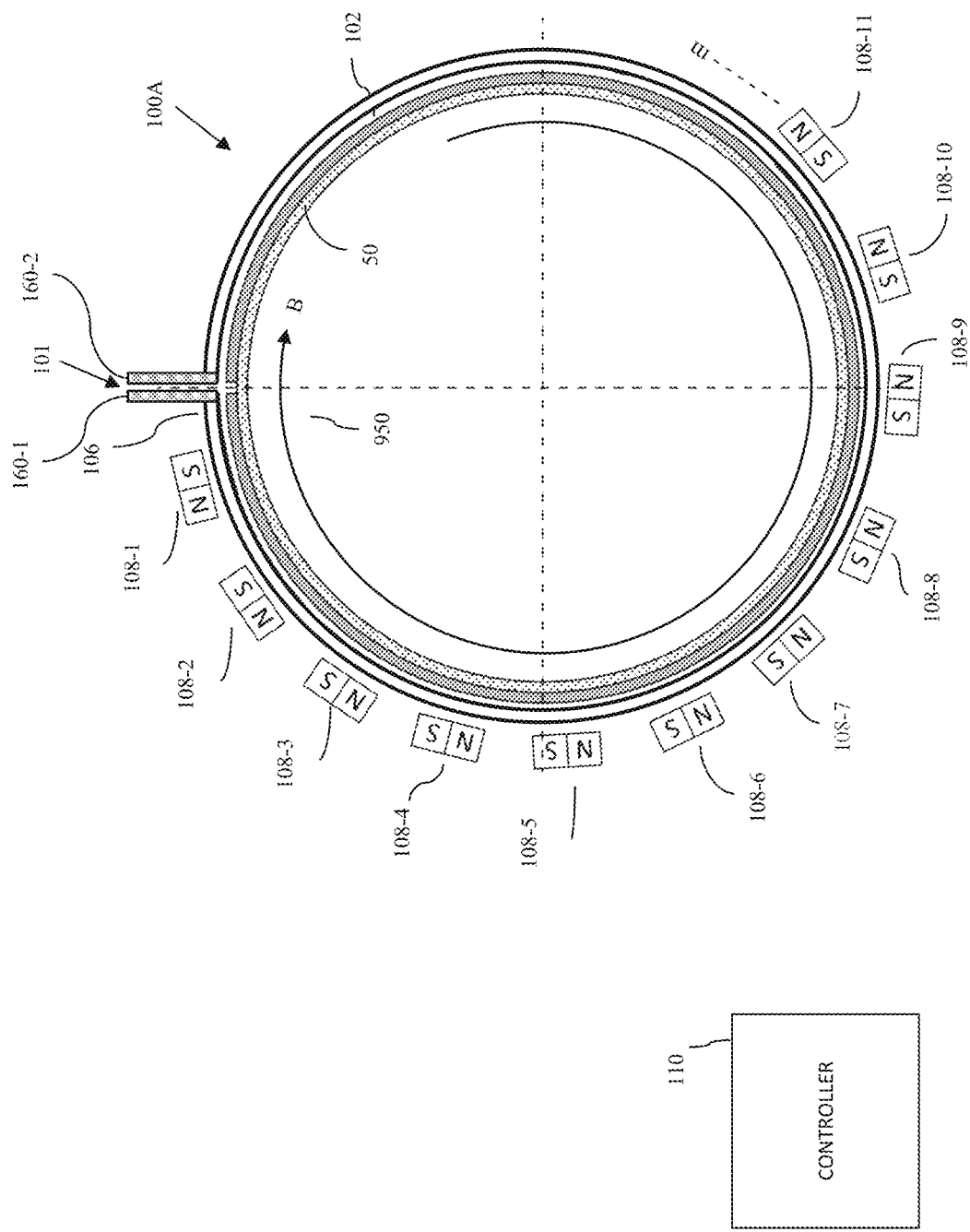
FIG. 3B is a cross-sectional side view of a second example of a single-layer axisymmetric magnetostrictive collar in accordance with some embodiments.

FIG. 3A illustrates one example of a system 100A for non-destructive testing or inspection utilizing magnetostriction. As shown in FIG. 3A, system 100A includes a magnetostrictive material 102 coupled to an object or structure 50 to be tested. Magnetostrictive/ferromagnetic material 102 may wrap or extend entirely around or across or at least partially around or across a common surface of object under test 50. In embodiments in which magnetostrictive material 102 does not wrap or extend entirely around or across object 50, a gap 101 may be defined by magnetostrictive material 102 as shown in FIGS. 3A and 3B. Examples of magnetostrictive/ferromagnetic materials include, but are not limited to, iron, nickel, cobalt, alloys of any one or more of such materials, and other materials such as Terfenol-D and Galfenol. In some embodiments, test object 50 has a circular cross-sectional area having a perimeter length (e.g., a circumference) and a longitudinal length to define a cylinder. The embodiment illustrated in FIG. 3A is one in which a flat flexible cable ("FFC") pulser/receiver coil 106 is wrapped around test object 50 and features at least one fold (not shown) at gap 101 such that FFC 106 may be wrapped back around said structure, adjacent to itself, such that both free ends of said FFC may be electrically connected or coupled to at least one circuit board 160. In some embodiments, circuit board 160 includes a connector for connecting the pulser/receiver coil 106 to another device, such as controller 110. However, it should also be understood that circuit board 160 may itself be a connector that provides the electrical connection between pulser/receiver coil 106 and another device. Circuit board 160 may also itself be a connector that provides electrical connections between conductors of one or more FFCs.

At least one pulser/receiver coil circuit 106 is comprised of a FFC configured against, or within close proximity to, a surface of magnetostrictive/ferromagnetic material 102. The magnetostrictive/ferromagnetic material 102 is temporarily or permanently coupled to a surface of the structure/object being tested 50. The at least one FFC pulser/receiver coil circuit 106 may completely encircle/extend across or partially encircle/extend across testing/inspection object 50 and is configured to receive and transmit voltage/current information from/to a controller 110.

In some embodiments, a single magnet or a plurality of magnets 108-1, 108-2, . . . , 108-$n$ ("magnets 108"), which may be permanent magnets or non-permanent electromagnetic magnets (e.g. using an electromagnet by a current-carrying wire wrapped around a ferromagnetic material, etc.), are placed within close proximity (e.g., less than or equal to one inch) to magnetostrictive material 102 such that the poles of each of the magnets 108 are directionally aligned. For example, and as illustrated in FIG. 3A, for the generation and reception of torsional guided wave energy, each of the magnets 108 is arranged such that as one circles the magnetostrictive material in a clockwise direction. In some embodiments, the south pole of a magnet 108 is encountered first and the north pole of the magnet is encountered second in order to impart a general biasing magnetic field 950 in magnetostrictive material 102. One of ordinary skill the in the art will understand that the orientation of the magnets may be switched such that the north pole of a magnet 108 is encountered first and the south pole of the same magnet 108 is encountered second as one moves clockwise around magnetostrictive material 102 in order to impart a general biasing magnetic field 950 opposite of that illustrated in FIG. 3A in magnetostrictive material 102. Furthermore, one of ordinary skill in the art will understand that the polarity of the magnets can be rotated so as to generate and receive longitudinal guided wave energy.

FIG. 3B illustrates one embodiment of a system 100B in which FFC pulser/receiver coil 106 is wrapped around test object 50 and is connected or coupled to a plurality of circuit boards 160 at gap 101. As shown in FIGS. 3A and 3B, a controller 110 is in signal communication with each of the pulser/receiver coil circuits 106.

Figure 3C:
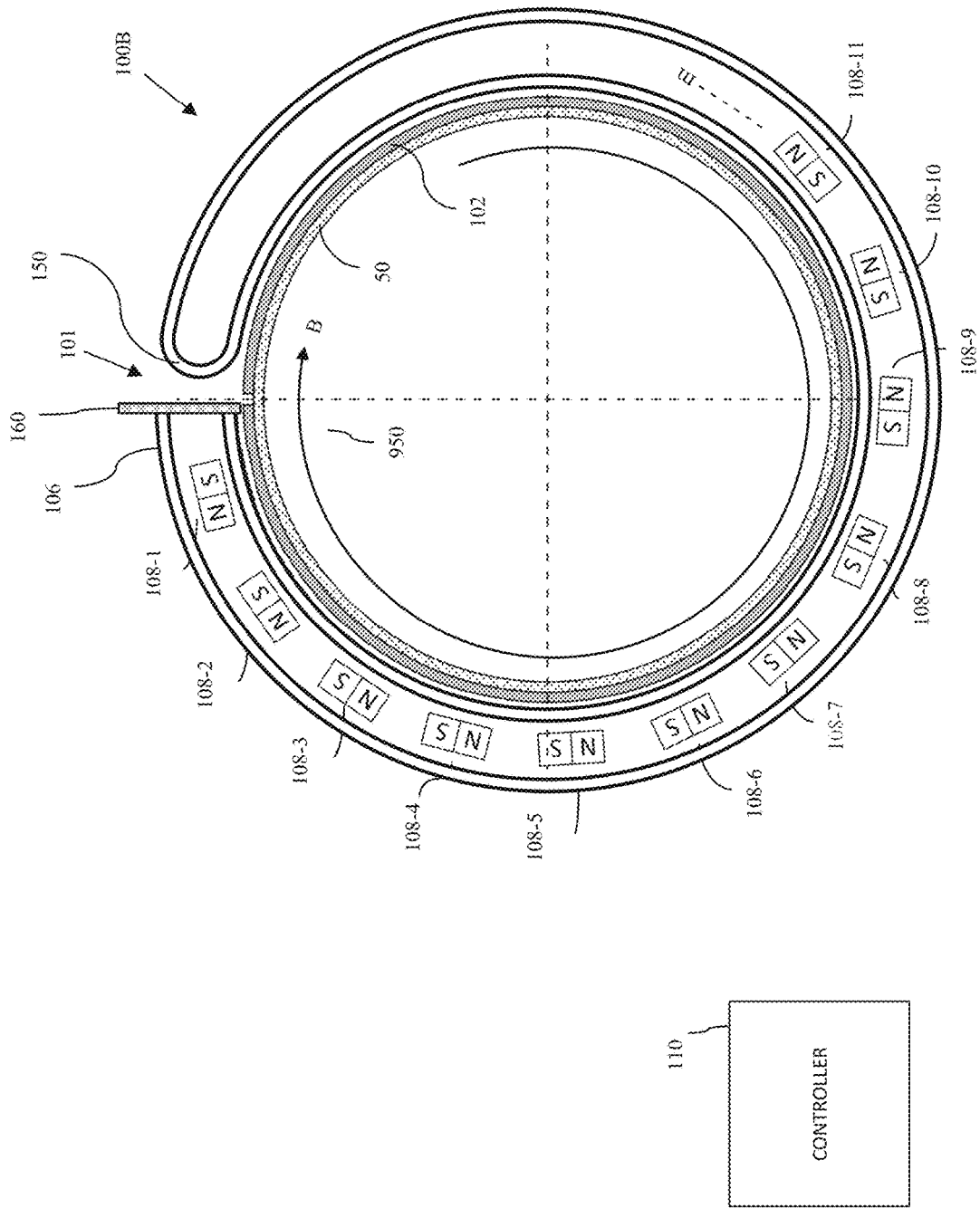
FIG. 3C is a cross-sectional side view of a first example of a double-layer axisymmetric magnetostrictive collar in accordance with some embodiments.

FIG. 3C illustrates one embodiment of a system 100C in which FFC pulser/receiver coil 106 is wrapped around test object 50 between magnetostrictive material 102 and magnets 108 and then wrapped/folded in at least one point 150 along its length and wrapped around test object 50 on the opposite side of magnets 108. In this embodiment, both free ends of FFC 106 are electrically connected or coupled to at least one circuit board 160.

Figure 3D:
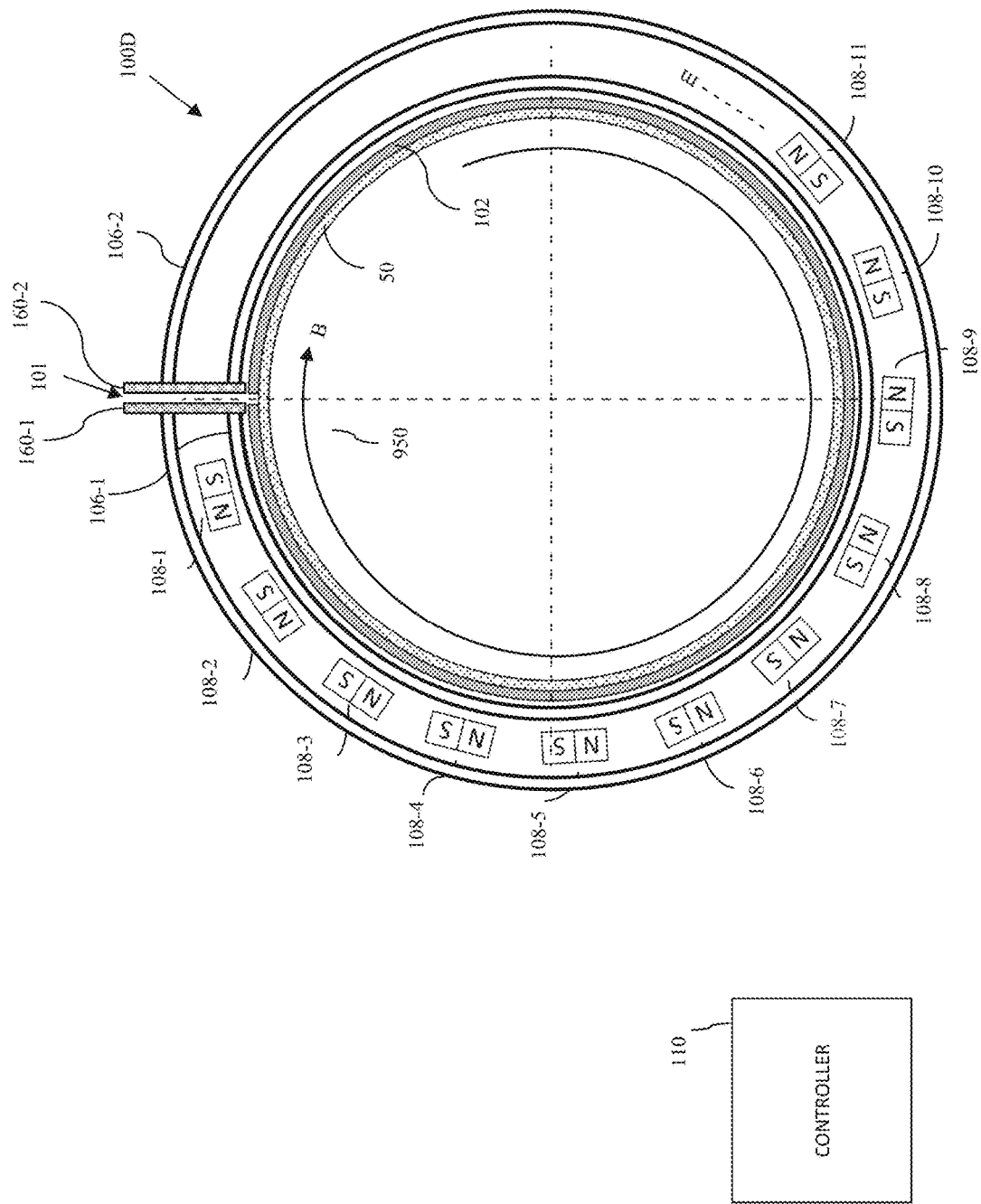
FIG. 3D is a cross-sectional side view of a second example of a double-layer axisymmetric magnetostrictive collar in accordance with some embodiments.

FIG. 3D illustrates one embodiment of a system 100D in which FFC pulser/receiver coil 106 is wrapped around test object 50 between magnetostrictive material 102 and magnets 108, is connected to a plurality of circuit boards 160 at gap 101, and at least one additional pulser/receiver coil 106-2 is wrapped around test object 50 on the opposite side of magnets 108, and is then electrically connected to circuit board 160-1. In this embodiment, all free ends of FFC 106 are electrically connected to at least one circuit board 160. Systems 100A-100D are configured such that all components have a collocated gap 101 such that the entire assembly can be opened and wrapped around test object 50 without connecting or disconnecting any electrical components of FFCs 106 or circuit boards 160.

In some embodiments, at least one magnet 108 is temporarily brought into close proximity with magnetostrictive material 102 and moved along its length in order to impart a general biasing magnetic field 950 in magnetostrictive material 102 and is subsequently removed from the collar assembly system 100A-100D.

Figure 4:
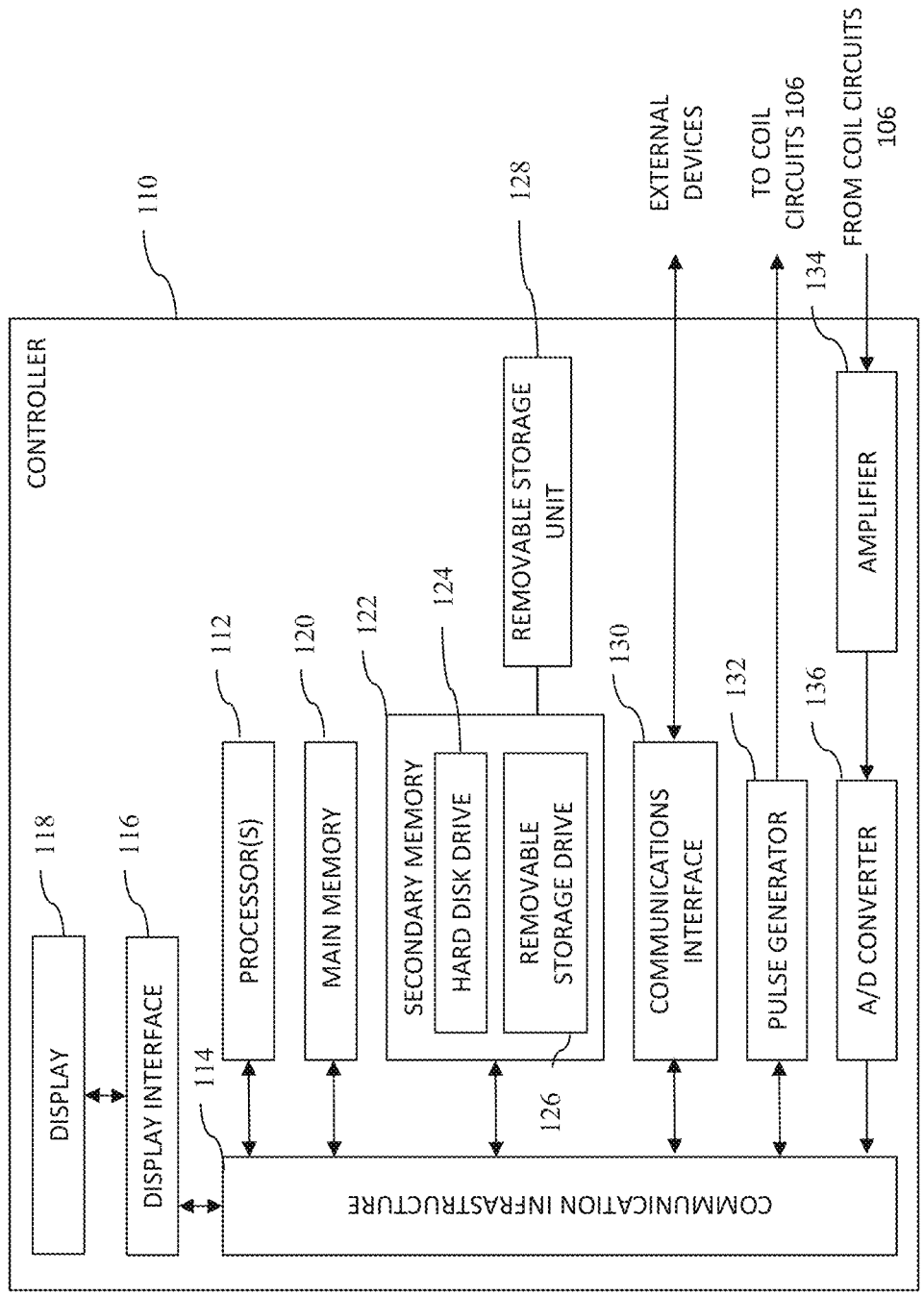
FIG. 4 is a block diagram of one example of a controller that may be used with the magnetostriction inspection systems in accordance with some embodiments.

FIG. 4 illustrates one example of an architecture of a controller 110. As shown in FIG. 4, controller 110 may include one or more processors, such as processor(s) 112. Processor(s) 112 may be any central processing unit ("CPU"), microprocessor, micro-controller, or computational device or circuit for executing instructions and be connected to a communication infrastructure 114 (e. g., a communications bus, cross-over bar, or network). Various software embodiments are described in terms of this exemplary controller 110. After reading this description, it will be apparent to one of ordinary skill in the art how to implement the method using other computer systems or architectures.

Controller 110 may include a display interface 116 that forwards graphics, text, and other data from the communication infrastructure 114 (or from a frame buffer not shown) for display on a monitor or display unit 118 that may be integrated with or separate from controller 110. Controller 110 also includes a main memory 120, such as a random-access memory ("RAM") and may also include a secondary memory 122. Secondary memory 122 may include a more persistent memory such as, for example, a hard disk drive 124 (including a solid state drive) and/or removable storage drive 126, representing an optical disk drive such as, for example, a DVD drive, a Blu-ray disc drive, or the like. In some embodiments, removable storage drive may be an interface for reading data from and writing data to a removable storage unit 128. Removable storage drive 126 reads from and/or writes to a removable storage unit 128 in a manner that is understood by one of ordinary skill in the art. Removable storage unit 128 represents an optical disc, a removable memory chip (such as an erasable programmable read only memory ("EPROM"), Flash memory, or the like), or a programmable read only memory ("PROM")) and associated socket, which may be read by and written to by removable storage drive 126. As will be understood by one of ordinary skill in the art, the removable storage unit 128 may include a computer usable/readable storage medium having stored therein computer software and/or data.

Controller 110 may also include one or more communication interface(s) 130, which allows software and data to be transferred between controller 110 and external devices such as, for example, pulser/receiver circuit coils 106 and optionally to a mainframe, a server, or other device. Examples of the one or more communication interface(s) 130 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. Software and data transferred via communications interface 130 are in the form of signals, which may be electronic, electromagnetic, optical, or other signals capable of being received by communications interface 130. These signals are provided to communications interface(s) 130 via a communications path or channel. The channel may be implemented using wire or cable, fiber optics, a telephone line, a cellular link, a radio frequency ("RF") link, or other communication channels.

In this document, the terms "computer program medium" and "computer readable medium" refer to non-transitory media such as removable storage units 128, 130, or a hard disk installed in hard disk drive 124. These computer program products provide software to controller 110. Computer programs (also referred to as "computer control logic") may be stored in main memory 120 and/or secondary memory 122. Computer programs may also be received via communications interface(s) 130. Such computer programs, when executed by a processor(s) 112, enable the controller 110 to perform the features of the methods discussed herein.

In an embodiment where the methods are implemented using software, the software may be stored in a computer program product and loaded into controller 110 using removable storage drive 126, hard drive 124, or communications interface(s) 130. The software, when executed by a processor(s) 112, causes the processor(s) 112 to perform the functions of the methods described herein. In another embodiment, the method is implemented primarily in hardware using, for example, hardware components such as application specific integrated circuits ("ASICs"). Implementation of the hardware state machine so as to perform the functions described herein will be understood by persons of ordinary skill in the art. In yet another embodiment, the method is implemented using a combination of both hardware and software.

Controller 110 also includes a pulse generator 132 configured to output a variety of pulses to pulser/receiver coil circuits 106. For example, pulse generator 132 may transmit time-delayed control signals to coil circuits 106, and/or pulse generator 132 may transmit control signals of varying amplitudes to coils 106. As will be understood by one of ordinary skill in the art, each separately controllable channel must have a corresponding pulse generator 132 that is coupled to one or more coils coil circuits 106 for directional wave control. An amplifier 134 is configured to amplify signals received from pulser/receiver coil circuits 106. Such signals received by coil circuits 106 include reflections of waves from structural features and other anomalies in test structure 50 in response to signals transmitted by pulse generator 132. An analog to digital ("A/D") converter 136 is coupled to an output of amplifier 134 and is configured to convert analog signals received from amplifier 134 to digital signals. The digital signals output from A/D converter 136 may be transmitted along communication infrastructure 114 where they may undergo further signal processing by processor(s) 112 as will be understood by one of ordinary skill in the art. For synthetic focusing, one of ordinary skill in the art will understand that a plurality of channels may be used in which each channel is coupled to a respective A/D converter 136, but each channel does not need to be connected to a respective pulse generator as in active focusing.

Figure 5:
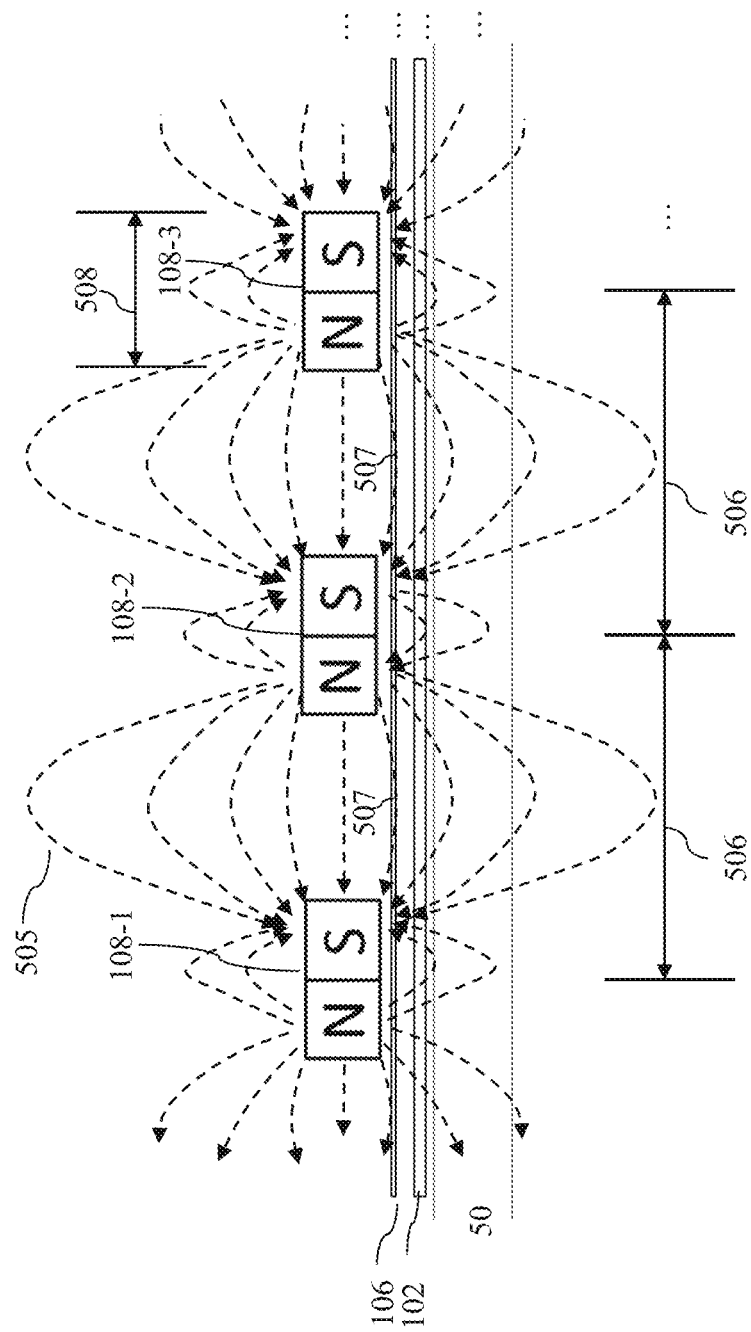
FIG. 5 illustrates a magnetic field in proximity to several components of one example of a magnetostrictive inspection system in accordance with some embodiments.

FIG. 5 illustrates the magnetic field lines induced by the plurality of magnets 108 in accordance with some embodiments. In some embodiments, the plurality of magnets 108 are configured with approximately equal spacing 506 between then such that the regions 507 of magnetostrictive material 102 between said magnets are exposed to magnetic field lines 505 that have a maximized component parallel to the longest dimension of said magnetostrictive material and a minimized component perpendicular to the surface formed by the two largest dimensions of said magnetostrictive material for the generation and reception of torsional guided wave energy. One of ordinary skill in the art will realize that the polarity of the magnets can be rotated so as to generate and receive longitudinal guided wave energy. In one embodiment, spacing 506 is approximately equal to 1.0 inches and the width 508 of each magnet 108-1, 108-2, and 108-3 is approximately 0.125 inches. One of ordinary skill in the art will understand that other magnet dimensions and spacing may be used to similar effect.

Figure 6A:
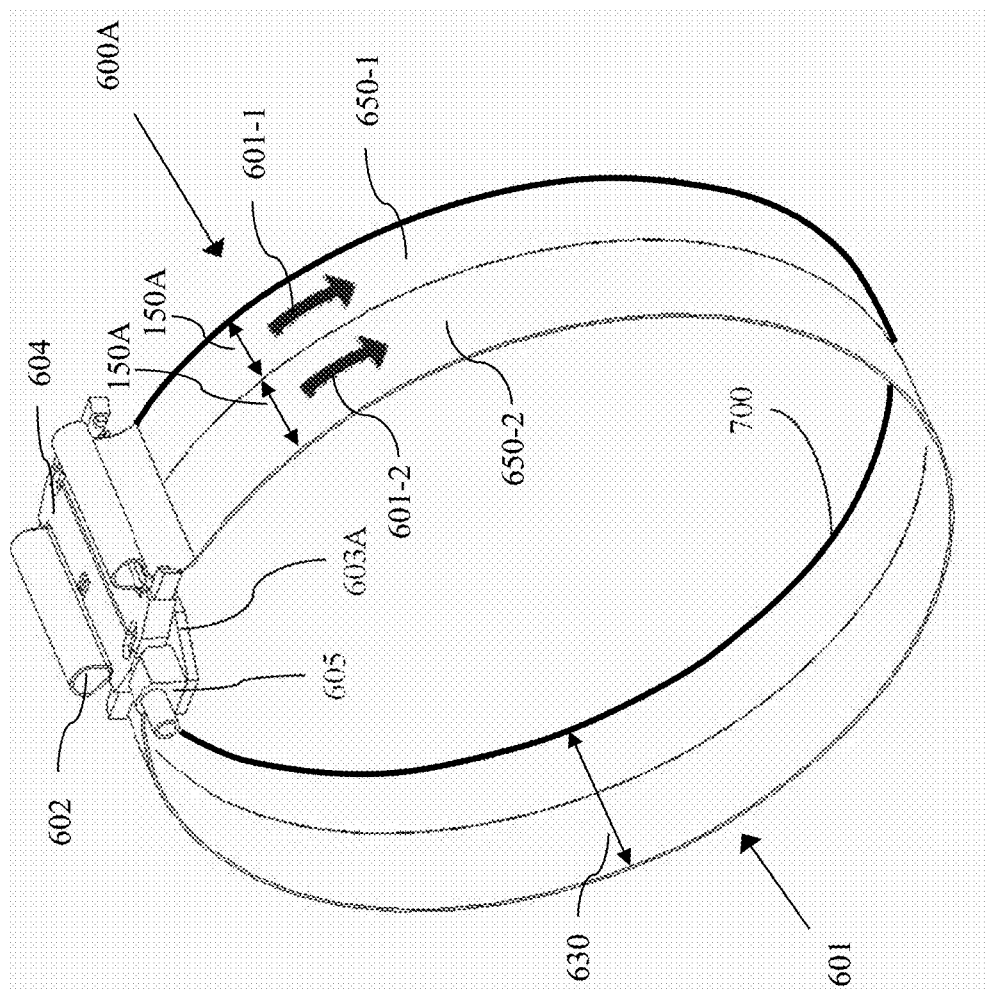
FIG. 6A is an isometric view of a first example of a conventional magnetostrictive inspection system that does not feature a closed-circuit configuration in accordance with some embodiments.
Figure 6B:
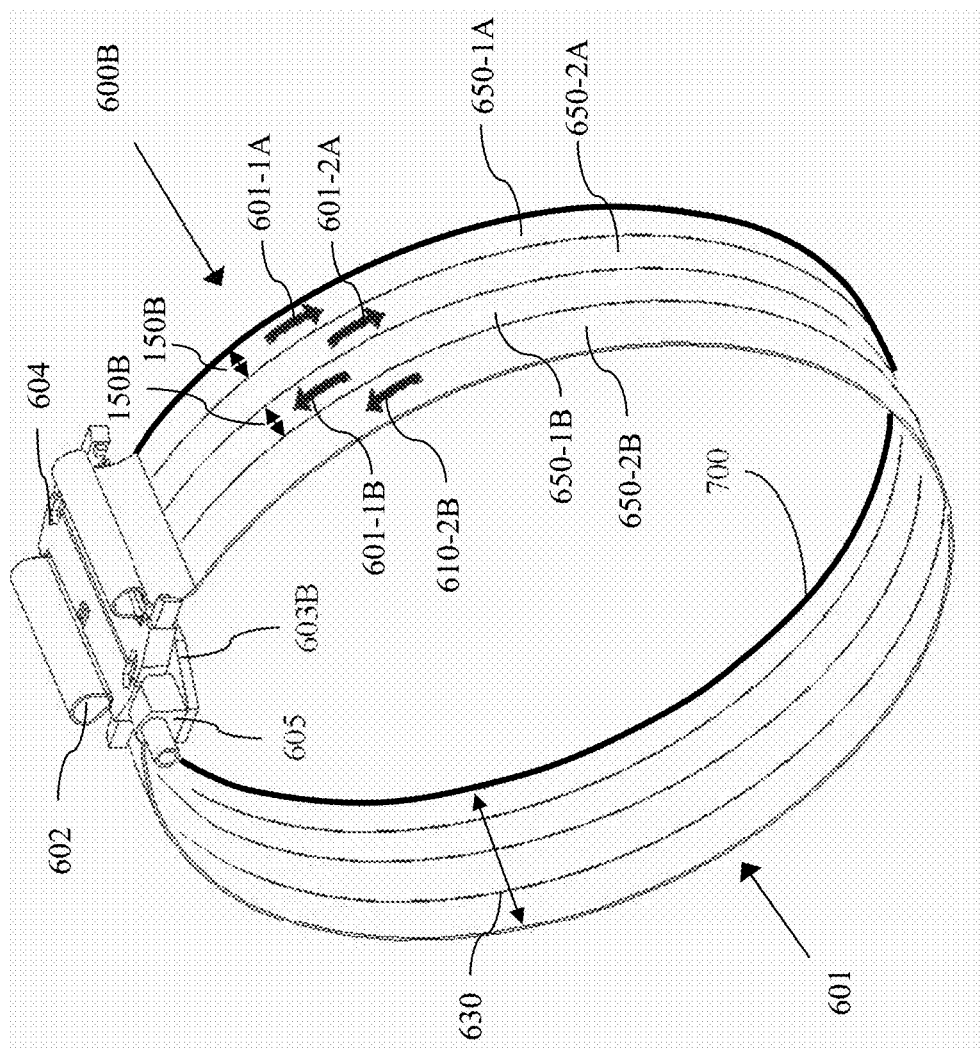
FIG. 6B is an isometric view of a second example of a conventional magnetostrictive inspection system that does not feature a closed-circuit configuration in accordance with some embodiments.

FIGS. 6A and 6B illustrate two embodiments of a FFC axisymmetric magnetostrictive collar 600A/B, which is comprised of at least one coil including a flat flexible cable (FFC) 601 with width 630 wrapped around a test object, such as a pipe, and placed adjacent to at least one ferromagnetic strip. Conventional FFC axisymmetric pulser collar 600A/B features slack 602 in FFC 601 to allow said collar 600A/B to accommodate pipes with a wide range of diameters. Pulser collar 600A/B generates guided waves in said pipe via the magnetostrictive effect by introducing a time-varying magnetic field in at least one magnetostrictive strip due time-varying currents in FFC 601 in the presence of a biasing magnetic field in said strips. Pulser collar 600A/B is further comprised of a circuit board 603A/B, at least one FFC connector 604, and signal connector 605. Circuit board 603A/B is designed such that the parallel traces, which may number between 20 and 200 traces per inch across the width 630 of FFC 601, are wired together to form at least one spiral coil 650 in said FFC that is separated into at least one subregion having subregion width 150A/B. The thicker line around the rightmost edge of the FFC is the first-trace indicator line 700. The subregion width 150A/B can be specified to control the guided wave sensitivity wavelength spectrum of collar 600A/B. It will be understood by those of ordinary skill in the art that said wavelength spectrum can be converted into an equivalent frequency spectrum for excitation of a guided wave mode with a known phase velocity. Signal connector 605 is configured to connect or couple collar 600A/B with the system electronics, which can include a pulser/receiver electronics system, a processor, and/or software to perform data analysis as described above with reference to FIG. 4 and in greater detail below.

In the embodiments illustrated in FIGS. 6A and 6B, coil width 150A or 150B is equal to ¼ of the preferential guided wave wavelength. In FIG. 6A, there are two coil subregions 650-1 and 650-2 that are offset by a distance equal to width 150A. Offsetting subregions 650-1 and 650-2 enables a wave to be generated in a single direction (e.g., towards the left or to the right in FIG. 6A) as the wave propagating in the opposite direction is canceled through destructive interference due to said offset and the manner in which controller 110 actuates the independently connected subregions 650-1 and 650-2 via connector 605 and circuit board 603A, as will be understood by those of ordinary skill in the art. Subregions 650-1 and 650-2 are configured via the trace pattern in circuit board 603A such that the positive current direction follows arrows 610-1 and 610-2, respectively.

FIG. 6B illustrates one embodiment in which there are four coil subregions 650-1A, 650-1B, 650-2A, and 650-2B that have equal width 150B. Offsetting subregions 650-1A/B and 650-2A/B, respectively, enables a wave to be generated in a single direction (e.g., towards the left or to the right in FIG. 6B) as the wave propagating in the opposite direction is canceled through destructive interference due to said offset and the manner in which controller 110 actuates the independently connected subregions 650-1A, 650-1B, 650-2A, and 650-2B via connector 605 and circuit board 603, as will be understood by those of ordinary skill in the art. Subregions 650-1A, 650-1B, 650-2A, and 650-2B are configured via the trace pattern in circuit board 603B such that the positive current direction follows arrows 610-1A, 610-1B, 610-2A, and 610-2B, respectively. Furthermore, the trace pattern in circuit board 603B is configured such that coil subregions 650-1A and 650-1B are electrically connected in series, and coil subregions 650-2A and 650-2B are electrically connected in series. The addition of multiple coil subregions, as denoted by "A" and "B", connected in series and offset from one another by a distance equal to ½ the preferential wavelength (twice the width 150B) can be advantageous in increasing the signal amplitude and sensitivity of the sensor system.

In some embodiments, circuit board 603A/B is interchangeable to allow the magnetostrictive guided wave pipeline inspection system to generate guided waves across a wide range of frequencies between 10 kHz and 2 MHz, such that the same FFC 601 can be used to generate or receive a wide range of guided wave frequencies by connecting it to a differently-configured circuit board 603A/B. For example, the collar 600B is configured to be preferentially sensitive to generating and receiving guided waves with a wavelength half (or a frequency double) that of collar 600A due to the different configuration of the subregions 650 in FFC 601 by means of the different trace configuration in circuit boards 603B and 603A.

Conventional FFC axisymmetric magnetostrictive collars such as those illustrated in FIGS. 6A and 6B require the FFC 601 to be wrapped around the test object and then electrically connected at the at least one FFC connector 604 such that the collar cannot be configured around said test object nor removed from said test object without connecting or disconnecting at least one connector 604, respectively. This is disadvantageous with regard to ease-of-use, durability, and sensor packaging. The disclosed systems feature a closed-circuit configuration that eliminates the need to electrically connect or disconnect any component of the sensor when configuring it around the test object or removing it from around said object.

Figure 7A:
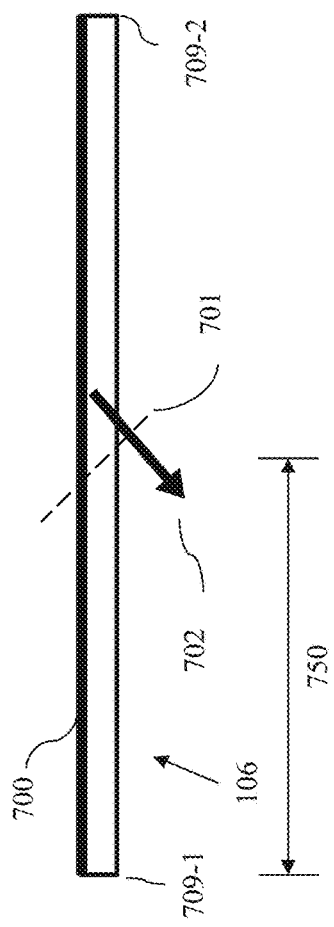
FIG. 7A is a plan view of an unfolded flat flexible cable ("FFC") used to construct a single-layer magnetostrictive coil in accordance with some embodiments.

FIGS. 7A-7D illustrate, for one embodiment, the series of folds in FFC 601 that enable the closed-circuit configuration for a single-layer coil 106 that is designed to have a finished coil length 750, such as, e.g. a coil 106 designed to be applied around the circumference of a pipe having a diameter approximately equal to finished coil length 750 divided by 7E. In FIG. 7A, FFC 601 has a length more than twice the finished coil length 750 and is oriented such that indicator line 700 is positioned upward. The first fold occurs at dashed line 701 in the direction indicated by arrow 702; the solid head of arrow 702 indicates an overhand fold such that free end 709-2 is lifted above the plane of FFC 601 as it is folded across line 701 in the general direction of free end 709-1.

Figure 7B:
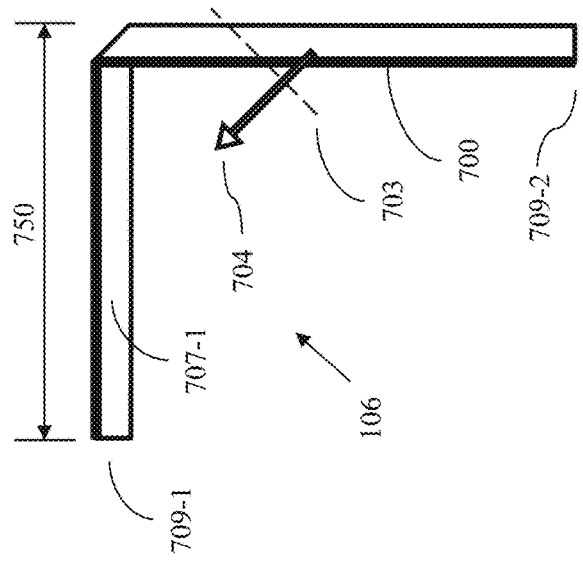
FIG. 7B is a plan view of an FFC used to construct a single-layer magnetostrictive coil after a first folding operation in accordance with some embodiments.

FIG. 7B illustrates the configuration of FFC 601 after the first fold illustrated in FIG. 7A has been completed, such that a first coil region 707-1 has been created that is approximately equal in length to finished coil length 750. Note that coil region 707-1 should not be confused with subregions 650, one or more of which may further comprise a region 707 across its width. The second fold is illustrated by line 703 and hollow arrow 704, indicating an underhand fold such that free end 709-2 is moved below the plane of FFC 601 as it is folded across line 703 in the general direction of region 707-1.

Figure 7C:
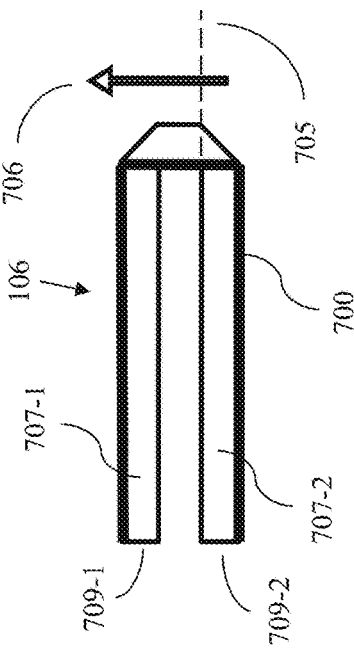
FIG. 7C is a plan view of an FFC used to construct a single-layer magnetostrictive coil after a second folding operation in accordance with some embodiments.

FIG. 7C illustrates the configuration of FFC 601 after the second fold illustrated in FIG. 7B has been completed, such that a second coil region 707-2 has been created that is approximately equal in length to finished coil length 750. The third fold is illustrated in by line 705 and hollow arrow 706.

Figure 7D:
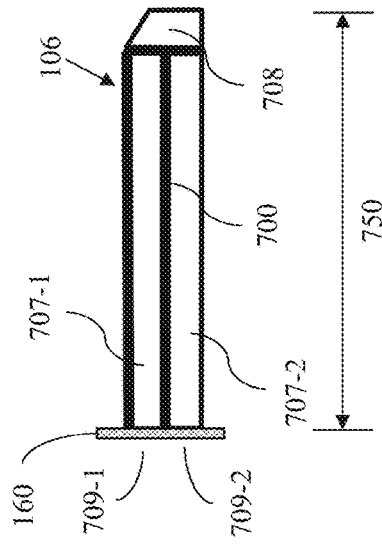
FIG. 7D is a plan view of a single-layer magnetostrictive coil after a third and final folding operation on an FFC in accordance with some embodiments.

FIG. 7D illustrates the configuration of FFC 601 after the third fold illustrated in FIG. 7C has been completed, such that the second coil region 707-2 has been configured adjacent to first coil region 701-1 with indicator line 700 on the upper side of both regions 707-1 and 707-2. The three folds illustrated in FIGS. 7A-7C create folded region 708. The three-fold operation illustrated in FIGS. 7A-7C create a configuration of FFC 601 that features two parallel adjacent regions 701-1 and 701-2. It is critical that indicator line 700 lies on the same side of each region 707-1 and 707-2 in order to achieve the correct current flow in the traces of FFC 601 during the generation or detection of guided waves using the coil. If indicator line 700 does not lie on the same side relative to each region 707, the directional control will not function properly. Furthermore, free ends 709-1 and 709-2 are configured at a common end of the finished single-layer coil 106 such that they can be electrically connected to a circuit board 160. The completed subassembly comprising FFC 601 and circuit board 160 in FIG. 7D can be wrapped around a pipe and removed from said pipe without the need to disconnect or connect and electrical connections between either free end 709-1 or 709-2 and circuit board 160, thereby advantageously creating a closed-circuit configuration.

FIGS. 8A-8J illustrate, for one embodiment, the series of folds in FFC 601 that enable the closed-circuit configuration for a double-layer coil 106 that is designed to have a finished coil length 750, such as, e.g. a coil 106 designed to be applied around the circumference of a pipe having a diameter approximately equal to finished coil length 750 divided by 7E such that inner coil layer 106-1 is nearest the outer surface of said pipe and outer coil layer 106-2 is farthest from said surface. If properly configured, the second coil layer advantageously provides additional magnetic field strength during guided wave generation and sensing.

Figure 8A:
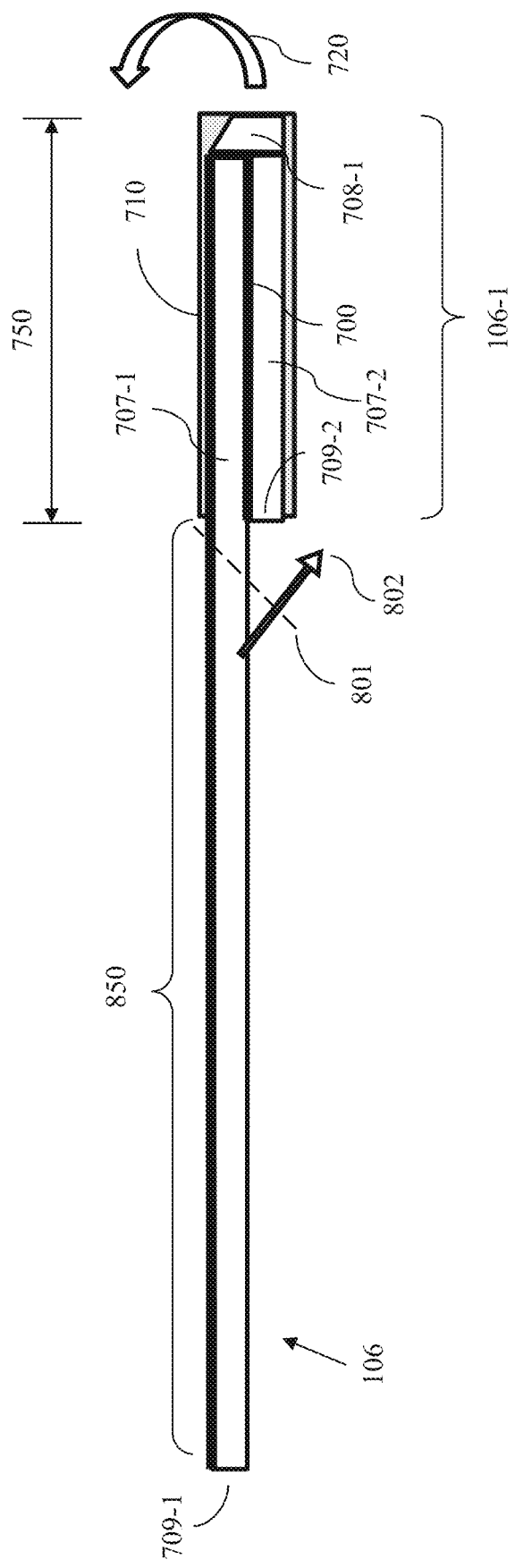
FIG. 8A is a plan view of an FFC used to construct a double-layer magnetostrictive coil having the first three folding operations completed and an intermediary layer introduced in accordance with some embodiments.

In FIG. 8A, FFC 601 has a length more than four times the finished coil length 750 and is oriented such that indicator line 700 is positioned upward. Note that the first three folding operations to create folded region 708-1 have been completed on the FFC as was illustrated for a shorter coil in FIGS. 7A-7D. The additional FFC length 850 will be used to advantageously form a second layer of coil 106 that will be configured on the opposite surface of intermediary layer 710, which, in some embodiments, at least partially comprises a plurality of magnets 108. In some embodiments, layer 710 is not present. The first fold occurs at line 801 in the direction indicated by hollow arrow 802. Note that for clarity, the next folding operation in FIG. 8B is illustrated after the entire subassembly has been flipped over from left to right as denoted by arrow 720 such that the surface of FFC 601 shown in FIG. 8A is facing downward in FIG. 8B.

Figure 8C:
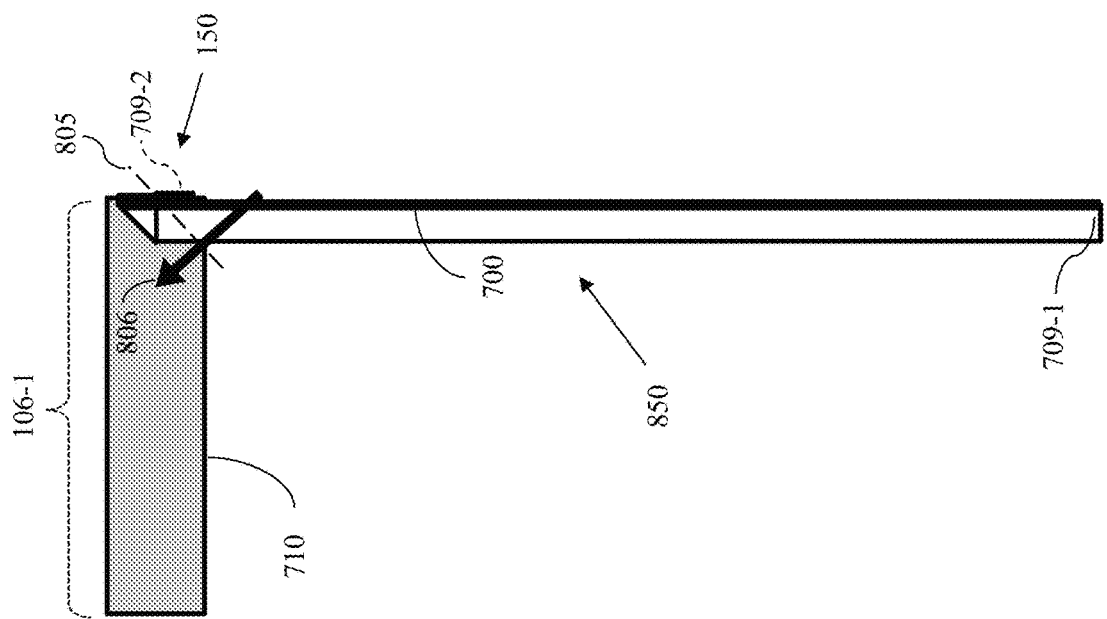
FIG. 8C is a plan view of an FFC and an intermediary layer used to construct a double-layer magnetostrictive coil after a fifth folding operation in accordance with some embodiments.
Figure 8B:
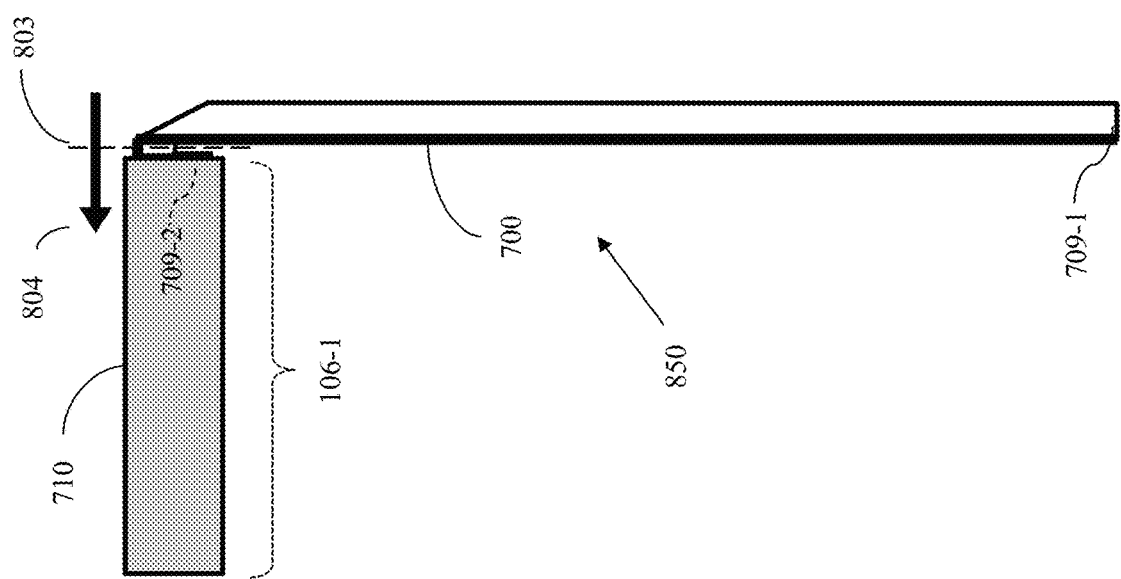
FIG. 8B is a plan view of an FFC and an intermediary layer used to construct a double-layer magnetostrictive coil after a fourth folding operation in accordance with some embodiments.

FIG. 8B illustrates the configuration of FFC 601 after the fourth fold illustrated in FIG. 8A has been completed (and flip 720 has been completed). The fifth fold is illustrated by line 803 and solid arrow 804.

FIG. 8C illustrates the configuration of FFC 601 after the fifth fold illustrated in FIG. 8B has been completed (and the flip 720 has been completed), such that it is wrapped around intermediary layer 710 at point 150. The sixth fold is illustrated by line 805 and solid arrow 806.

Figure 8D:
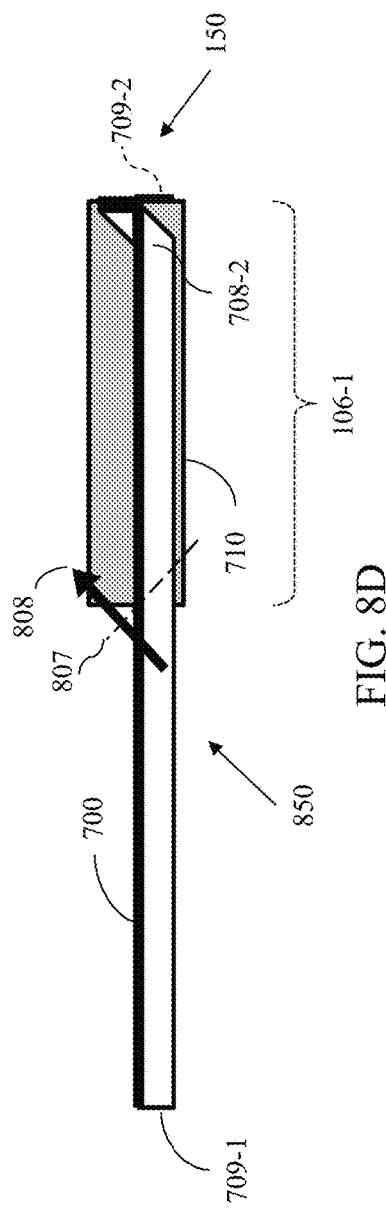
FIG. 8D is a plan view of an FFC and an intermediary layer used to construct a double-layer magnetostrictive coil after a sixth folding operation in accordance with some embodiments.

FIG. 8D illustrates the configuration of FFC 601 after the sixth fold illustrated in FIG. 8C has been completed. The three folds illustrated in FIGS. 8A-8C create folded region 708-2. The seventh fold is illustrated by line 807 and solid arrow 808.

Figure 8E:
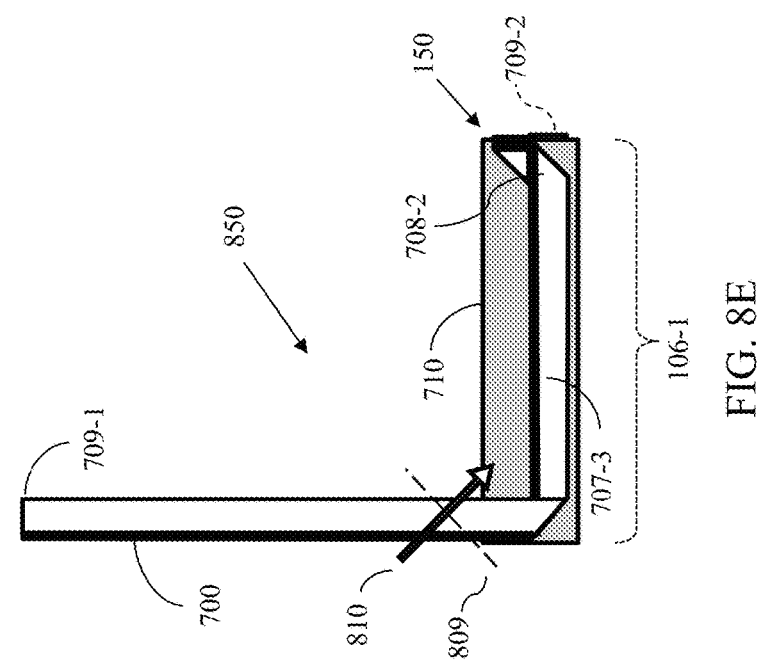
FIG. 8E is a plan view of an FFC and an intermediary layer used to construct a double-layer magnetostrictive coil after a seventh folding operation in accordance with some embodiments.

FIG. 8E illustrates the configuration of FFC 601 after the seventh fold illustrated in FIG. 8D has been completed, such that a third coil region 707-3 has been configured opposite to second coil region 707-2 with indicator line 700 on the upper side of all regions 707-1, 707-2, and 707-3. The eighth fold is illustrated by line 809 and hollow arrow 810.

Figure 8F:
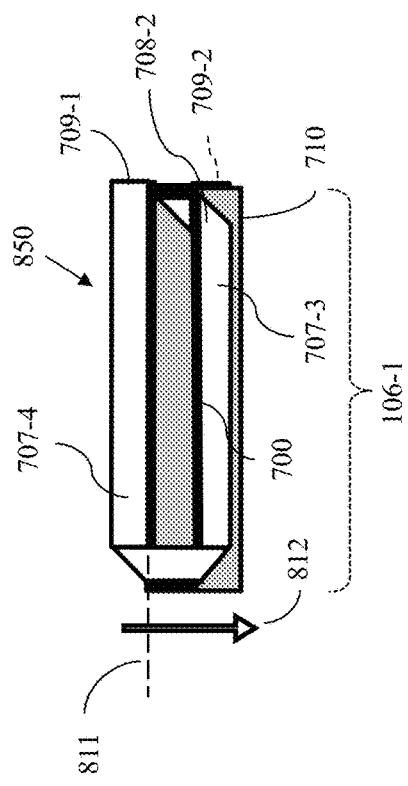
FIG. 8F is a plan view of an FFC and an intermediary layer used to construct a double-layer magnetostrictive coil after an eighth folding operation in accordance with some embodiments.

FIG. 8F illustrates the configuration of FFC 601 after the eighth fold illustrated in FIG. 8E has been completed such that a fourth coil region 707-4 has been created that is approximately equal in length to finished coil length 750. The ninth fold is illustrated by line 811 and hollow arrow 812.

Figure 8G:
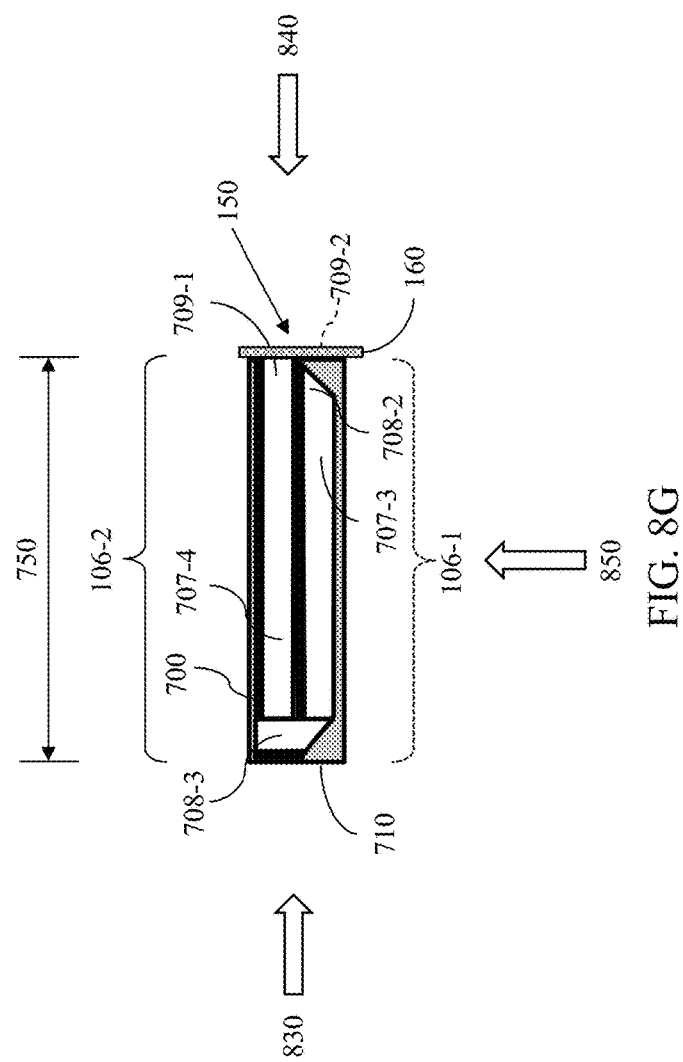
FIG. 8G is a plan view of a double-layer magnetostrictive coil after a ninth and final folding operation on an FFC in accordance with some embodiments.

FIG. 8G illustrates the configuration of FFC 601 after the ninth fold illustrated in FIG. 8F has been completed such that coil region 707-4 has been configured adjacent to coil region 707-3 and opposite coil region 707-1 with indicator line 700 on the upper side of all regions 707-1, 707-2, 707-3, and 707-4. The three folds illustrated in FIGS. 8D-8F create third folded region 708-3. Indicator line 700 lies on the same side of each region 707-1, 707-2, 707-3, and 707-4 and that coil region 707-1 and 707-4 are oriented in the same direction (from end 709-1 to 709-2) and that 707-2 and 707-3 are oriented in the same direction (from end 709-1 to 709-2) in order to achieve the correct current flow in the traces of FFC 601 during the generation or detection of guided waves using the coil. If indicator line 700 does not lie on the same side relative to each region 707, the directional control will not function properly and/or the current in the outer layer 106-2 will at least partially cancel the current in the inner layer 106-1, thereby reducing the signal amplitude. The canceling effect of the return traces when the regions are configured improperly can be reduced by increasing the distance between layers 106-1 and 106-2, but this entails significantly greater sensor thickness and does not strengthen the current (and therefore the signal) in the sensor coil as in the disclosed system. Furthermore, free ends 709-1 and 709-2 are configured at a common end of the finished double-layer coil 106 (comprised of inner coil layer 106-1 and outer coil layer 106-2) such that they can be electrically connected to a circuit board 160. The completed subassembly comprising FFC 601 and circuit board 160 in FIG. 8G can be wrapped around a pipe and removed from said pipe without the need to disconnect or connect and electrical connections between either free end 709-1 or 709-2 and circuit board 160, thereby advantageously creating a closed-circuit configuration.

Figure 8H:
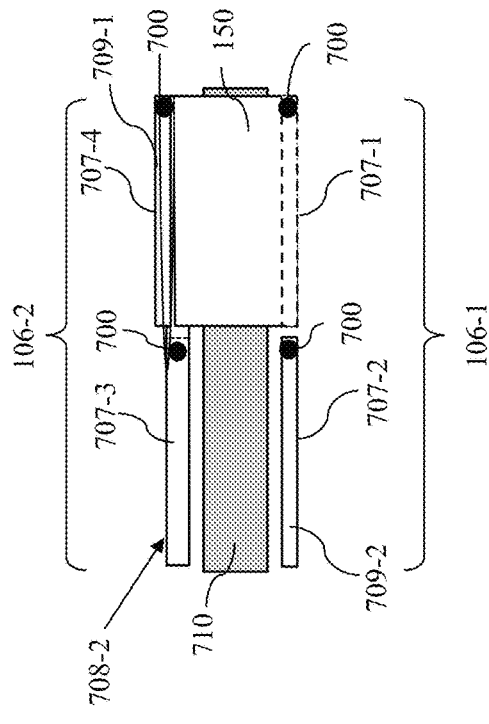
FIG. 8H is a first end view of a double-layer magnetostrictive coil in accordance with some embodiments.

FIG. 8H illustrates an end view of one embodiment of a double-layer magnetostrictive coil as viewed from the perspective indicated by arrow 830 in FIG. 8G with circuit board 160 removed for clarity. Note that inner coil layer 106-1 and outer coil layer 106-2 are configured on opposing sides of intermediary layer 710 and that, from this perspective, folded regions 708-1 and 708-3 are visible.

Figure 8I:
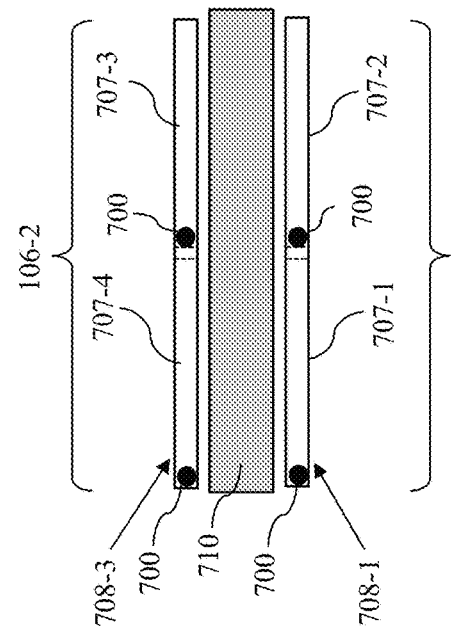
FIG. 8I is a second end view of a double-layer magnetostrictive coil in accordance with some embodiments.

FIG. 8I illustrates an end view of one embodiment of a double-layer magnetostrictive coil as viewed from the perspective indicated by arrow 840 in FIG. 8G with circuit board 160 removed for clarity. Note that inner coil layer 106-1 and outer coil layer 106-2 are configured on opposing sides of intermediary layer 710 and the FFC wraps around layer 710 at point 150. From this perspective, free ends 709-1 and 709-2 are visible, at which point they can be electrically connected to a common circuit board 160 (not shown).

Figure 8J:
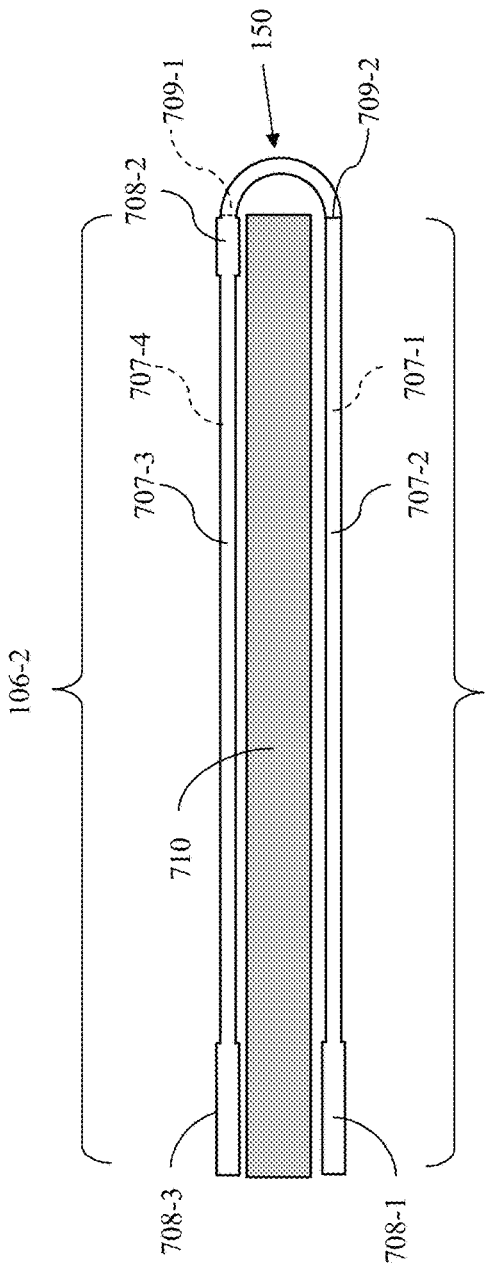
FIG. 8J is a side view of a double-layer magnetostrictive coil in accordance with some embodiments.

FIG. 8J illustrates a side view of one embodiment of a double-layer magnetostrictive coil as viewed from the perspective indicated by arrow 850 in FIG. 8G with circuit board 160 removed for clarity. Note that inner coil layer 106-1 and outer coil layer 106-2 are configured on opposing sides of intermediary layer 710 and the FFC wraps around layer 710 at point 150. Also note that free ends 709-1 and 709-2 are collocated on the right-hand end of the double-layer coil subassembly, at which point they can be electrically connected or coupled to a common circuit board 160 (not shown).

In some embodiments, additional circuit boards can be used to replace the function of at least one of the folded regions 708, as is illustrated by circuit board 160-2 in FIGS. 3B and 3D. The printed circuit board can be one of a rigid or flexible printed circuit board.

In some embodiments, additional layers of coils can be advantageously added to the single-layer and double-layer coil embodiments disclosed herein.

In some embodiments, collar 100 further comprises additional components that connect the disclosed components, maintain their relative configuration, and may further serve to protect or environmentally seal the components of said collar.

In some embodiments, axisymmetric magnetostrictive collar 100 is removed from test object 50 following testing. In some additional embodiments, collar 100 is allowed to remain installed on test object 50 for an extended period of time in order to facilitate at least one test in the future.

In some embodiments, axisymmetric magnetostrictive collar 100 is attached to test object 50 by at least one of at least one clamp, adhesive tape and adhesive compound. Furthermore, a sealing compound may be used to environmentally seal collar 100 and magnetostrictive material 102 from environmental damage including, but not limited to, the ingress of moisture and contaminants.

In some embodiments, magnetostrictive material 102 is one of permanently or temporarily attached to axisymmetric magnetostrictive collar 100 by at least one of adhesive tape, adhesive compound, and mechanical fasteners. In some additional embodiments, magnetostrictive material 102 is not attached to collar 100 such that magnetostrictive material 102 is first ultrasonically coupled to test object 50 and collar 100 is second installed at least partially on top of said magnetostrictive material.

In some embodiments, magnetostrictive material 102 is ultrasonically coupled to test object 50 by at least one of adhesive tape, adhesive compound, viscous shear gel couplant, mechanical pressure, and welding.

It will be obvious to those of ordinary skill in the art that a closed-circuit configuration, in which the orientation and direction of each coil region 707 is advantageously configured as described herein, can be achieved by modifying, reversing, rearranging the order of, or adding additional folding operations to the FFC.

Although the systems and methods have been described in terms of exemplary embodiments, they are not limited thereto. Rather, the appended claims should be construed broadly, to include other variants and embodiments of the systems and methods, which may be made by those of ordinary skill in the art without departing from the scope and range of equivalents.

What is claimed is:

1. A sensor having a first end and a second end, the sensor comprising:
    a flexible cable including a plurality of independent electrical coils, each independent coil of the plurality of independent electrical coils extending from the first end of the sensor to the second end of the sensor; and
    a connector disposed at the first end of the sensor and electrically coupled to each independent electrical coil of the plurality of independent electrical coils,
    wherein the plurality of independent electrical coils form a plurality of closed circuits configured to increase a signal amplitude during guided wave generation and to increase a sensitivity during guided wave sensing when the sensor is wrapped at least partially around a structure to be tested such that the first end of the sensor is disposed adjacent to the second end of the sensor and is separated from the second end of the sensor by a gap.

2. The sensor of claim 1, wherein the flexible cable includes at least one fold.

3. The sensor of claim 1, wherein the flexible cable includes a plurality of folds located at the second end of the sensor.

4. The sensor of claim 1, further comprising a second connector disposed at the second end of the sensor and electrically coupled to each independent coil of the plurality of independent electrical coils.

5. The sensor of claim 1, wherein a second end of each independent electrical coil of the plurality of independent electrical coils is coupled to a second connector.

6. The sensor of claim 1, further comprising at least one biasing magnet configured to be disposed adjacent to the plurality of independent electrical coils.

7. The system of claim 1, further compromising a housing that encloses the flexible cable.

8. A system, comprising:
    at least one strip of magnetostrictive material configured to be wrapped at least partially around a surface of a structure;

at least one biasing magnet for applying a biasing magnetic field to said at least one magnetostrictive material;

an assembly having a first end and a second end, the assembly comprising:
- a flexible cable arranged to provide a plurality of independent electrical coils forming a plurality of closed-circuits, each independent electrical coil of the plurality of independent electrical coils extending from the first end of the assembly to the second end of the assembly;
- a connector disposed at the first end of the assembly and electrically coupled to each independent electrical coil of the plurality of independent electrical coils; and a processor in signal communication with the plurality of independent electrical coils, the processor configured to generate current in the plurality of independent electrical coils, wherein the plurality of independent electrical coils is configured such that current generated by the processor will at least one of increase a signal amplitude during guided wave generation and increase a sensitivity during guided wave sensing.

9. The system of claim 8, wherein the flexible cable includes at least one fold located at the second end of the assembly.

10. The system of claim 8, wherein:
the flexible cable has a length,
a first portion of the length extends between the first end of the assembly and the second end of the assembly, the first portion of the length is disposed adjacent to the at least one magnetostrictive material on a first side of the first portion,
a second portion of the length extending between the first end and the second end of the flexible cable assembly and disposed adjacent to a second side of the first portion that is opposite the first side of the first portion, and
each independent electrical coil of the plurality of independent electrical coils provided by the first and second portions of the flexible cable is configured to at least one of increase a magnetic field during guided wave generation and increase a sensitivity to a magnetic field during guided wave sensing.

11. The system of claim 10, wherein said at least one biasing magnet is configured at least partially between the first portion of the length of the flexible cable and the second portion of the length of the flexible cable, said first portion is disposed between the at least one magnet and the at least one magnetostrictive material, and said second portion is disposed on an opposite side of the at least one magnet.

12. The system of claim 8, further comprising a second connector disposed at the second end of the assembly and electrically coupled to each independent electrical coil of the plurality of independent electrical coils.

13. The system of claim 12, wherein the first and second connectors are configured to electrically couple overlapping portions of the plurality of independent electrical coils.

14. A method, comprising:
applying a biasing magnetic field to a magnetostrictive material that is wrapped around a structure to be tested; and
generating current in each independent electrical coil of a plurality of independent electrical coils of a flexible cable of an assembly that is wrapped around the structure to be tested such that a first end of the assembly is disposed adjacent to a second end of the assembly and is separated from the second end of the assembly by a gap, wherein the current flowing through each independent electrical coil of the plurality of independent electrical coils at least one of increases a signal amplitude during guided wave generation and increases a sensitivity during guided wave sensing.

15. A system, comprising: at least one strip of magnetostrictive material configured to be wrapped at least partially around a surface of a structure; at least one biasing magnet for applying a biasing magnetic field to said at least one magnetostrictive material; a flexible cable arranged to provide a plurality of independent electrical coils, each of the plurality of independent electrical coils extending from a first end to a second end; a connector electrically coupled to the first end of at least one of the plurality of independent electrical coils; and a processor in signal communication with the plurality of independent electrical coils, the processor configured to generate current in the plurality of independent electrical coils, wherein the plurality of independent electrical coils is configured such that current generated by the processor will flow in a common direction between the first ends and the second ends within each said independent coil, and wherein the plurality of independent electrical coils have a length, a first portion of the length is disposed adjacent to the at least one magnetostrictive material on a first side of the first portion, and a second portion of the length is disposed adjacent to a second side of the first portion that is opposite the first side of the first portion.

16. A system, comprising:
at least one strip of magnetostrictive material configured to be wrapped at least partially around a surface of a structure;
at least one biasing magnet for applying a biasing magnetic field to said at least one magnetostrictive material;
a flexible cable arranged to provide a plurality of independent electrical coils, each of the plurality of independent electrical coils extending from a first end to a second end;
a connector electrically coupled to the first end of at least one of the plurality of independent electrical coils; and
a processor in signal communication with the plurality of independent electrical coils, the processor configured to generate current in the plurality of independent electrical coils,
wherein the plurality of independent electrical coils is configured such that current generated by the processor will flow in a common direction between the first ends and the second ends within each said independent coil, and
wherein said at least one biasing magnet is configured at least partially between a first portion of the plurality of independent electrical coils and a second portion of the independent electrical coils, said first portion is disposed between the at least one magnet and the at least one magnetostrictive material, and said second portion is disposed on an opposite side of the at least one magnet.

* * * * *